United States Patent
Kim et al.

(10) Patent No.: US 12,522,704 B2
(45) Date of Patent: Jan. 13, 2026

(54) POLYIMIDE FILM HAVING HIGH DIMENSIONAL STABILITY AND MANUFACTURING METHOD THEREFOR

(71) Applicant: PI Advanced Materials Co., Ltd., Chungcheongbuk-do (KR)

(72) Inventors: Dong-Young Kim, Chungcheongbuk-do (KR); Dae-Geon Yoo, Chungcheongbuk-do (KR); Dong-Young Won, Chungcheongbuk-do (KR)

(73) Assignee: PI Advanced Materials Co., Ltd., Chungcheongbuk-do (KR)

( * ) Notice: Subject to any disclaimer, the term of this patent is extended or adjusted under 35 U.S.C. 154(b) by 279 days.

(21) Appl. No.: 18/037,675

(22) PCT Filed: Nov. 22, 2021

(86) PCT No.: PCT/KR2021/095108
§ 371 (c)(1),
(2) Date: May 18, 2023

(87) PCT Pub. No.: WO2022/114938
PCT Pub. Date: Jun. 2, 2022

(65) Prior Publication Data
US 2024/0026098 A1    Jan. 25, 2024

(30) Foreign Application Priority Data
Nov. 24, 2020  (KR) .................. 10-2020-0159335

(51) Int. Cl.
*C08J 5/18*        (2006.01)
*B32B 15/08*     (2006.01)
(Continued)

(52) U.S. Cl.
CPC ............... *C08J 5/18* (2013.01); *B32B 27/281* (2013.01); *C08G 73/1042* (2013.01);
(Continued)

(58) Field of Classification Search
CPC .......... C08J 5/18; C08J 2379/08; C08J 7/044; C08G 73/1042; C08G 73/105; C08G 73/1071; C08G 73/1067; C08L 79/08; C23C 14/14; C23C 14/24; C23C 14/34; B32B 27/281; B32B 15/08; B32B 15/20;
(Continued)

(56) References Cited

FOREIGN PATENT DOCUMENTS

| CN | 104250529 | 12/2014 |
| JP | 2005186574 | 7/2005 |

(Continued)

*Primary Examiner* — John D Freeman
(74) *Attorney, Agent, or Firm* — Brooks, Cameron & Huebsch, PLLC

(57) ABSTRACT

The present invention provides a polyimide film and a manufacturing method therefor, wherein the polyimide film satisfies the following equation (1) as measured for dimensional change by a thermomechanical analyzer (TMA) undergoing a temperature elevation process from 25° C. to 400° C. and then a cooling process from 400° C. to 25° C. Equation (1) dimensional measurement in TD direction (cooling, 50° C.)−dimensional measurement in TD direction (temperature elevation, 50° C.)<0 μm.

10 Claims, 2 Drawing Sheets

(51) Int. Cl.
  *B32B 27/28* (2006.01)
  *C08G 73/10* (2006.01)
  *C08J 7/044* (2020.01)
  *B32B 15/20* (2006.01)

(52) U.S. Cl.
  CPC ....... *C08G 73/105* (2013.01); *C08G 73/1071* (2013.01); *C08J 7/044* (2020.01); *B32B 15/08* (2013.01); *B32B 15/20* (2013.01); *B32B 2307/518* (2013.01); *B32B 2307/734* (2013.01); *B32B 2457/08* (2013.01); *C08J 2379/08* (2013.01)

(58) Field of Classification Search
  CPC ........ B32B 2307/518; B32B 2307/734; B32B 2457/08
  See application file for complete search history.

(56) References Cited

FOREIGN PATENT DOCUMENTS

| | | | |
|---|---|---|---|
| JP | 20100215840 | | 9/2010 |
| JP | 2014012827 | | 1/2014 |
| JP | 2014012827 | A * | 1/2014 |
| JP | 2014043511 | A * | 3/2014 |
| JP | 2015160878 | A * | 9/2015 |
| JP | 2018058923 | | 4/2018 |
| JP | 2019151748 | | 9/2019 |
| JP | 2020152765 | | 9/2020 |
| KR | 20080104194 | | 12/2008 |
| KR | 1020110036961 | | 4/2011 |
| KR | 101375276 | | 3/2014 |
| KR | 20150001662 | | 1/2015 |
| KR | 20150011323 | | 1/2015 |
| KR | 1020160002402 | | 1/2016 |
| KR | 20200030268 | | 3/2020 |
| KR | 20200030442 | | 3/2020 |
| KR | 20200055879 | | 5/2020 |
| TW | 201506060 | | 2/2015 |
| WO | 2008146637 | | 12/2008 |

* cited by examiner

POLYIMIDE FILM HAVING HIGH DIMENSIONAL STABILITY AND MANUFACTURING METHOD THEREFOR

TECHNICAL FIELD

The present disclosure relates to a polyimide film that maintains flatness even after a metal foil clad is applied, sputtered, or deposited thereon so that wrinkles do not occur, and to a method for manufacturing the same.

BACKGROUND ART

Polyimides (PIs) have a strong aromatic main chain and imide rings that are chemically stable. PIs are polymeric materials having the highest level of heat resistance, chemical resistance, electrical insulation, chemical resistance, and weather resistance among organic materials.

Polyimide films are becoming increasingly popular as materials for use in various electronic devices that require the properties described above.

Examples of microelectronic components to which polyimide films are applicable include thin circuit boards with high circuit density and flexibility to support the weight reduction and miniaturization of electronic products. Polyimide films are widely used as insulating films for the thin circuit boards.

The thin circuit board has a structure in which a circuit including a metal foil clad is formed on an insulating film. The thin circuit board is generally referred to as a flexible metal foil clad laminate in a broad sense and as a flexible copper clad laminate (FCCL) in a narrower sense when using a copper plate as a metal foil clad.

Flexible metal foil clad laminates are manufactured by the following methods: (i) a casting method, in which polyamic acid as a polyimide precursor is casted or applied on a metal foil clad and then imidized; (ii) a metallization method, in which a metal layer is directly deposited onto a polyimide film by sputtering; and (iii) a laminating method, in which a polyimide film made from a thermoplastic polyimide and a metal foil clad are bonded to each other by heat and pressure.

Particularly, the metallization is a technique of forming a flexible metal foil clad laminate by sequentially depositing a tie layer and a seed layer by sputtering a metal such as copper on a polyimide film having a thickness of 20 to 38 μm. The metallization is advantageous in terms of being capable of forming an ultra-fine circuit having a circuit pattern pitch of 35 μm or less, and the method is widely used to manufacture a flexible metal foil clad laminate for a chip on film (COF).

Recently, a polyimide film used in a flexible metal foil clad laminate manufactured by a metallization method or the like has a problem in that the flatness of the polyimide film is deteriorated and wrinkles occur in the polyimide film after a metal foil clad is laminated thereon.

Therefore, there is an urgent need for a polyimide film capable of maintaining flatness after a metal foil clad is laminated thereon.

Matters described in the background art above are intended only to aid understanding of the background of the disclosure, and thus it should be noted that matters not belonging to the prior art already known to those skilled in the art to which the present disclosure pertains may also be described in the background art section.

DOCUMENTS OF RELATED ART

Patent Document (Patent Document 1) Korean Patent No. 10-1375276
(Patent Document 2) Korean Patent Application Publication No. 2016-0002402

DISCLOSURE

Technical Problem

The objective of the present disclosure is to provide a polyimide film that maintains flatness even after a metal foil clad is applied, sputtered, or deposited thereon so that wrinkles do not occur in the polyimide film, and to a method for manufacturing the same.

The objectives to be achieved by the present disclosure are not limited to the ones mentioned above, and other objectives not mentioned above can be clearly understood by those skilled in the art from the following description.

Technical Solution

In one aspect of the present disclosure for achieving the above objective, there is provided a polyimide film exhibiting dimensional changes satisfying Formula (1) below during a dimensional change measurement process using a thermomechanical analyzer (TMA) in which the polyimide film first undergoes a heating cycle up to 400° C. from 25° C. and subsequently a cooling cycle down to 25° C. from 400° C.

$$\text{TD dimension value measured (cooling, 50° C.)} - \text{TD dimension value measured (heating, 50° C.)} < 0 \text{ μm} \quad \text{Formula (1)}$$

In Formula (1), the term "TD dimension measurement value (cooling, 50° C.)" refers to the value of a dimension in a transverse direction (TD), which is measured at 50° C. during a cooling cycle, and the term "TD dimension measurement value (heating, 50° C.)" refers to the value of a dimension in the transverse direction (TD), which is measured at 50° C. at the beginning of a heating cycle.

In another aspect of the present disclosure, there is provided a method for manufacturing a polyimide film, the method including: preparing a polyamic acid solution from an acid dianhydride component and a diamine component; forming a self-supporting film by casting and heating the polyamic acid solution on a support; and imidizing and stretching the self-supporting film to produce the polyimide film.

In a further aspect of the present disclosure, there is provided a flexible metal foil clad laminate including the polyimide film and an electrically conductive metal foil clad.

In a yet further aspect of the present disclosure, there is provided an electronic component including the flexible metal foil clad laminate.

Advantageous Effects

The present disclosure provides a polyimide film having a predetermined dimensional change range, thereby having excellent flatness even after metal foil lamination is performed on the polyimide film.

The polyimide film has applications in various fields where a polyimide film with excellent flatness is required. For example, the polyimide film may be used in flexible metal foil clad laminates prepared by a metallization method or in electronic components including the flexible metal foil clad laminate.

BEST MODE

Figure 1:
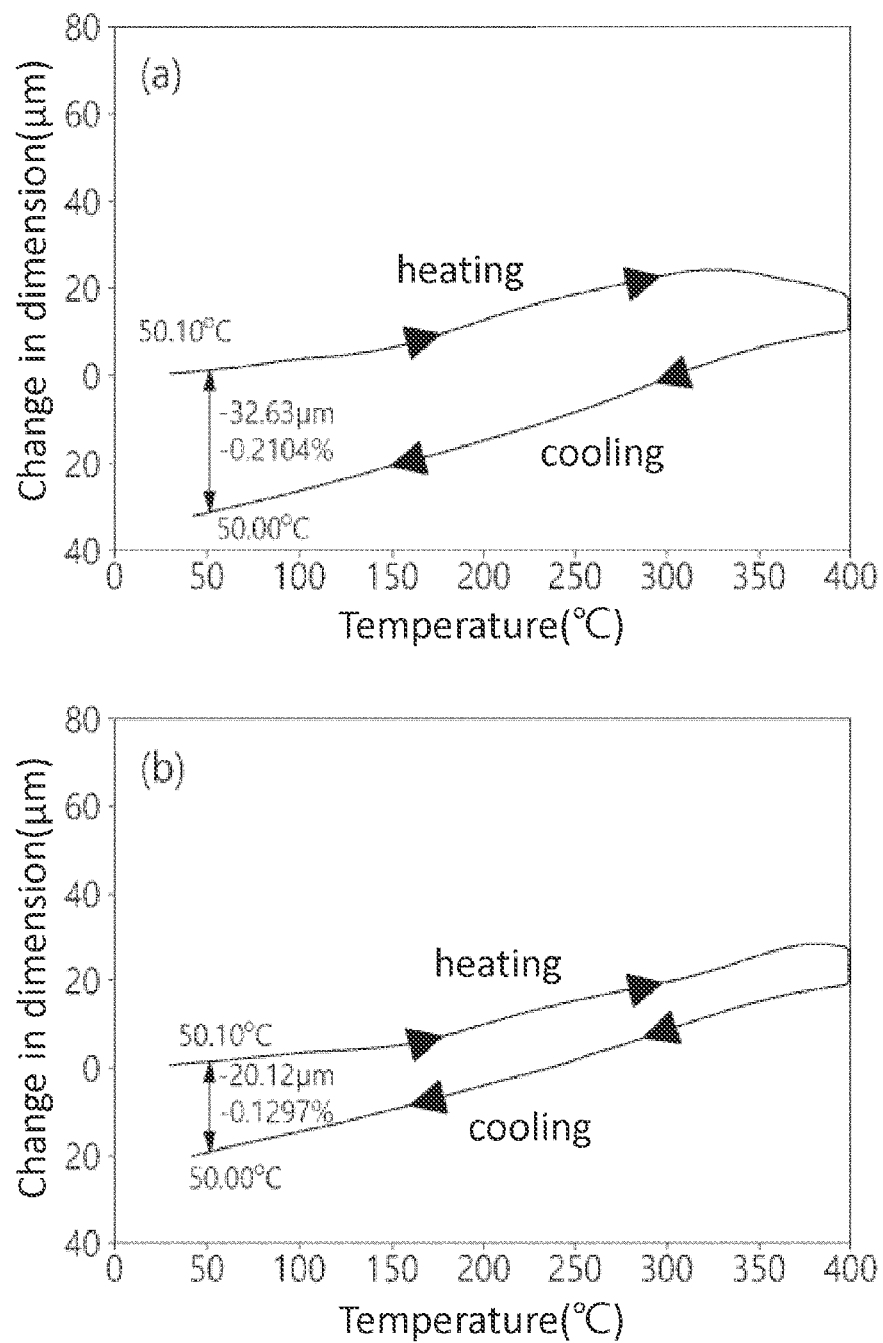
FIG. 1 is a graph showing measurements of dimensional changes measured with a thermomechanical analyzer (TMA) in films according to Examples 1 and 2 undergo a heating cycle from 25° C. to 400° C. and subsequently a cooling cycle process from 400° C. to 25° C.

Prior to giving the following detailed description of the present disclosure, it should be noted that the terms and words used in the specification and the claims should not be construed as being limited to ordinary meanings or dictionary definitions but should be construed in a sense and concept consistent with the technical idea of the present disclosure, on the basis that the inventor can properly define the concept of a term to describe its invention in the best way possible.

The features of exemplary embodiments described herein are presented for illustrative purposes and do not exhaustively represent the technical spirit of the present disclosure. Accordingly, it should be appreciated that there will be various equivalents and modifications that can replace the exemplary embodiments at the time at which the present application is filed.

As used herein, the singular forms "a", "an", and "the" are intended to include the plural forms as well unless the context clearly indicates otherwise. It will be further understood that the terms "comprising", "including", or "having" when used in the present disclosure specify the presence of stated features, regions, integers, steps, operations, elements and/or components, but do not preclude the presence or addition of one or more other features, regions, integers, steps, operations, elements, components and/or combinations thereof.

As used herein, "acid dianhydrides" may refer to not only acid dianhydrides but also their precursors or derivatives, which they technically may not be acid dianhydrides but will nonetheless react with diamines to form polyamic acids which in turn will be converted to polyimides.

As used herein, "diamines" may refer to not only diamines but also their precursors or derivatives, which technically may not be diamines but will nonetheless react with dianhydrides to form polyamic acids which in turn will be converted to polyimides.

When amounts, concentrations, or other values or parameters herein are given as ranges, preferred ranges, or recitations of preferred upper and lower limit values, It should be understood as specifically disclosing all ranges formed by any pair of any upper limit or preferred value and any lower limit or preferred value, regardless of whether the ranges are separately disclosed.

When a range of numerical values is recited herein, the range is intended to include its endpoints and all integers and fractions between the endpoints, unless stated otherwise. It is intended that the scope of the present disclosure is not limited to the specific values mentioned when defining a range.

A polyimide film according to one embodiment of the present disclosure satisfies Formula (1) below during a dimensional change measurement process performed with a thermomechanical analyzer (TMA) in which the polyimide film undergoes a heating cycle up to 400° C. from 25° C. and subsequently a cooling cycle down to 25° C. from 400° C.

$$\text{TD dimension measurement value (cooling, 50° C.)} - \text{TD dimension measurement value (heating, 50° C.)} < 0 \text{ μm} \qquad \text{Formula (1)}$$

In Formula (1), the term "TD dimension measurement value (cooling, 50° C.)" refers to the value of a dimension in a transverse direction (TD), which is measured at 50° C. during a cooling cycle, and the term "TD dimension measurement value (heating, 50° C.)" refers to the value of a dimension in the transverse direction (TD), which is measured at 50° C. at the beginning of a heating cycle.

That is, regarding to the polyimide film of the present disclosure, as shown in Formula (1) above, the result value obtained by subtracting the TD dimension measurement value (heating, 50° C.) from the TD dimension measurement value (heating, 50° C.) is a negative number.

The reason why the value is a negative number is that the polyimide film contracts in the transverse direction (TD) in the cooling cycle following the heating cycle.

Preferably, the result value of Formula (1) for the polyimide film of the present disclosure may be −5 μm or less. More preferably, the result value of Formula (1) may be −10 μm or less. Even more preferably, the result value of Formula (1) may be −20 μm or less.

The polyimide film satisfying the condition that the result value of Formula (1) is a negative number can maintain the flatness thereof even after a metal foil clad is formed thereon and does not wrinkle.

In the case of a polyimide film having the condition that the calculation value of Formula (1) is zero or greater, the flatness of the polyimide film is deteriorated, and wrinkles are generated in the polyimide film after a metal foil clad is formed on the polyimide film through coating, sputtering, or deposition.

The reason why the value is zero or greater is that the polyimide film expands in the transverse direction (TD) in the heating cycle following the cooling cycle.

Here, the measurement of dimensional change using the thermomechanical analyzer (TMA) was conducted under the following conditions.

Measurement mode: tensile mode, load 5 g,
Sample length: 15 mm,
Sample width: 4 mm,
Heating start temperature: 25° C.,
Heating stop temperature: 400° C. (no holding time at 400° C.),
Cooling stop temperature: 25° C.,
Heating and cooling rates: 10° C./min,
Atmosphere for measurement: nitrogen.

The polyimide film of the present disclosure has a coefficient of thermal expansion of 2 to 6.5 ppm/° C. in an MD direction, which is a direction in which film formation progresses, is a film lengthwise direction, and is perpendicular to the transverse direction (TD). The polyimide film of the present disclosure has a coefficient of thermal expansion of 1 to 6 ppm/° C. in a TD direction.

In addition, the value obtained by subtracting the coefficient of thermal expansion in the TD direction from the coefficient of thermal expansion in the MD direction may be in a range of 0 ppm/° C. or more and 2.5 ppm/° C. or less.

Besides, the polyimide film may have an elastic modulus of 5 GPa or more and 11 GPa or less and a glass transition temperature of 360° C. or more and 400° C. or less.

On the other hand, the polyimide film of the present disclosure may be obtained by imidizing one or more acid dianhydride components and one or more diamine components, the one or more acid dianhydrides components being selected from the group consisting of pyromellitic dianhydride (PMDA), oxydiphthalic dianhydride (ODPA), 3,3',4,4'-biphenyltetracarboxylic dianhydride (s-BPDA), 2,3,3',4'-biphenyltetracarboxylic dianhydride (a-BPDA), diphenylsulfone-3,4,3',4'-tetracarboxylic dianhydride (DSDA), bis(3,4-dicarboxyphenyl)sulfide dianhydride, 2,2-bis(3,4-dicarboxyphenyl)-1,1,1,3,3,3-hexafluoropropane dianhydride, 2,3,3',4'-benzophenonetetracarboxylic dianhydride, 3,3',4,4'-benzophenonetetracarboxylic dianhydride (BTDA), bis(3,4-dicarboxyphenyl)methane dianhydride, 2,2-bis(3,4-dicarboxyphenyl)propane dianhydride, p-phenylene bis(trimellitic monoester acid anhydride), p-biphenylene bis(trimellitic monoester acid anhydride), m-terphenyl-3,4,3',4'-tetracarboxylic dianhydride, p-terphenyl-3,4,3',4'-tetracarboxylic dianhydride, 1,3-bis(3,4-dicarboxyphenoxy)benzene dianhydride, 1,4-bis(3,4-dicarboxyphenoxy)benzene dianhydride, 1,4-bis(3,4-dicarboxyphenoxy)biphenyl dianhydride, 2,2-bis[(3,4-dicarboxy phenoxy)phenyl]propane dianhydride (BPADA), 2,3,6,7-naphthalenetetracarboxylic dianhydride, 1,4,5,8-naphthalenetetracarboxylic dianhydride, and 4,4'-(2,2-hexafluoroisopropylidene)diphthalic acid dianhydride, the one or more diamine components being selected from the group consisting of paraphenylenediamine (PPD), meta-phenylenediamine, 3,3'-dimethylbenzidine, 2,2'-dimethylbenzidine, 2,4-diaminotoluene, 2,6-diaminotoluene, 3,5-diaminobenzoic acid (DABA), 4,4'-diaminodiphenyl ether (ODA), 3,4'-diaminodiphenyl ether, 4,4'-diaminodiphenylmethane(methylenediamine), 3,3'-dimethyl-4,4'-diaminobiphenyl, 2,2'-dimethyl-4,4'-diaminobiphenyl, 2,2'-bis(trifluoromethyl)-4,4'-diaminobiphenyl, 3,3'-dimethyl-4,4'-diaminodiphenylmethane, 3,3'-dicarboxy-4,4'-diaminodiphenylmethane, 3,3',5,5'-tetramethyl-4,4'-diaminodiphenylmethane, bis(4-aminophenyl)sulfide, 4,4'-diaminobenzanilide, 3,3'-dimethoxybenzidine, 2,2'-dimethoxybenzidine, 3,3'-diaminodiphenyl ether, 3,4'-diaminodiphenyl ether, 4,4'-diaminodiphenyl ether, 3,3'-diaminodiphenyl sulfide, 3,4'-diaminodiphenylsulfide, 4,4'-diaminodiphenylsulfide, 3,3'-diaminodiphenylsulfone, 3,4'-diaminodiphenylsulfone, 4,4'-diaminodiphenylsulfone, 3,3'-diaminobenzophenone, 4,4'-diaminobenzophenone, 3,3'-diamino-4,4'-dichlorobenzophenone, 3,3'-diamino-4,4'-dimethoxybenzophenone, 3,3'-diaminodiphenylmethane, 3,4'-diaminodiphenylmethane, 4,4'-diaminodiphenylmethane, 2,2-bis(3-amino Phenyl)propane, 2,2-bis(4-aminophenyl)propane, 2,2-bis(3-aminophenyl)-1,1,1,3,3,3-hexafluoropropane, 2,2-bis(4-aminophenyl)-1,1,1,3,3,3-hexafluoropropane, 3,3'-diaminodiphenylsulfoxide, 3,4'-diaminodiphenylsulfoxide, 4,4'-diaminodiphenylsulfoxide, 1,3-bis(3-aminophenyl)benzene, 1,3-bis(4-aminophenyl)benzene, 1,4-bis(3-aminophenyl)benzene, 1,4-bis(4-aminophenyl)benzene, 1,3-bis(4-aminophenoxy)benzene (TPE-R), 1,4-bis(4-aminophenoxy)benzene (TPE-Q) 1,3-bis(3-aminophenoxy)-4-trifluoromethylbenzene, 3,3'-diamino-4-(4-phenyl)phenoxybenzophenone, 3,3'-diamino-4,4'-di(4-phenylphenoxy)benzophenone, 1,3-bis(3-aminophenylsulfide)benzene, 1,3-bis(4-aminophenylsulfide)benzene, 1,4-bis(4-aminophenylsulfide)benzene, 1,3-bis(3-aminophenylsulfone)benzene, 1,3-bis(4-aminophenylsulfone)benzene, 1,4-bis(4-aminophenylsulfone)benzene, 1,3-bis[2-(4-aminophenyl)isopropyl]benzene, 1,4-bis[2-(3-aminophenyl)isopropyl]benzene, 1,4-bis[2-(4-aminophenyl)isopropyl]benzene, 3,3'-bis(3-aminophenoxy)biphenyl, 3,3'-bis(4-aminophenoxy)biphenyl, 4,4'-bis(3-aminophenoxy)biphenyl, 4,4'-bis(4-aminophenoxy))biphenyl, bis[3-(3-aminophenoxy)phenyl]ether, bis[3-(4-aminophenoxy)phenyl]ether, bis[4-(3-aminophenoxy)phenyl]ether, bis[4-(4-aminophenoxy)phenyl] ether, bis[3-(3-aminophenoxy)phenyl]ketone, bis[3-(4-aminophenoxy)phenyl]ketone, bis[4-(3-aminophenoxy)phenyl]ketone, bis[4-(4-aminophenoxy)phenyl]ketone, bis[3-(3-aminophenoxy)phenyl]sulfide, bis[3-(4-aminophenoxy)phenyl] sulfide, bis[4-(3-aminophenoxy)phenyl]sulfide, bis[4-(4-aminophenoxy)phenyl]sulfide, bis[3-(3-aminophenoxy)phenyl]sulfone, bis[3-(4-aminophenoxy)phenyl]sulfone, bis[4-(3-aminophenoxy)phenyl]sulfone, bis[4-(4-aminophenoxy)phenyl]sulfone, bis[3-(3-aminophenoxy)phenyl]methane, bis[3-(4-aminophenoxy)phenyl]methane, bis[4-(3-aminophenoxy)phenyl]methane, bis[4-(4-aminophenoxy)phenyl]methane, 2,2-bis[3-(3-aminophenoxy)phenyl]propane, 2,2-bis[3-(4-aminophenoxy)phenyl]propane, 2,2-bis[4-(3-aminophenoxy)phenyl]propane, 2,2-bis[4-(4-aminophenoxy)phenyl] propane (BAPP), 2,2-bis[3-(3-aminophenoxy)phenyl]-1,1,1,3,3,3-hexafluoropropane, 2,2-bis[3-(4-aminophenoxy)phenyl]-1,1,1,3,3,3-hexafluoropropane, 2,2-bis[4-(3-aminophenoxy)phenyl]-1,1,1,3,3,3-hexafluoropropane, and 2,2-bis[4-(4-aminophenoxy)phenyl]-1,1,1,3,3,3-hexafluoropropane.

Preferably, the polyimide film is obtained by an imidization reaction of a polyamic acid containing: an acid dianhydride component including at least one selected from 3,3',4,4'-biphenyltetracarboxylic dianhydride (s-BPDA) and pyromellitic dianhydride (PMDA); and a diamine component including at least one selected from paraphenylene diamine (PPD) and 4,4'-diaminodiphenyl ether (ODA)).

Based on a total content of 100 mol % of the acid dianhydride component, the content of 3,3',4,4'-biphenyltetracarboxylic dianhydride is 40 mol or more and 60 mol % or less, and the content of pyromellitic dianhydride is 40 mol % or more and 60 mol % or less, and based on a total content of 100 mol % of the diamine component, the content of paraphenylene diamine is 80 mol % or more and 90 mole or less, and the content of 4,4'-diaminodiphenyl ether is 10 mol % or more and 20 mol % or less.

In the present disclosure, the polyamic acid is prepared by, for example, one of the following methods:

(1) a method in which the entire amount of the diamine components is first placed in a solvent, then the acid dianhydride components are added thereto so as to be substantially equimolar to the diamine components, followed by polymerization;

(2) a method in which the entire amount of the acid dianhydride components is first placed in a solvent, and the diamine components are then added thereto to be substantially equimolar to the acid dianhydride components, followed by polymerization;

(3) a method in which one or more diamine components of the total diamine components to be used are placed in a solvent, one or more acid dianhydride components of the total acid dianhydride components to be used are added thereto so as to be in a ratio of about 95 mol % to 105 mol % with respect to the diamine components present in the solvent, the remaining diamine components are then added, and the remaining acid dianhydride components are added so that the total amount of the diamine components is equimolar to the total amount of the acid dianhydride components, followed by polymerization;

(4) a method in which one acid dianhydride component is placed in a solvent, one diamine component is added thereto to be in a ratio of 95 mol % to 105 mol % with respect to the reactive component in the solvent, a different acid dianhydride component is added thereto, and the remaining diamine component is added thereto so that the total amount of the diamine components is equimolar to the total amount of the acid dianhydride components, followed by polymerization; and (5) a method in which one or more diamine components and one or more acid dianhydride components are reacted in a first solvent in which either the diamine components or the acid dianhydride components are present in an excessive amount, to form a first composition; one or more diamine components and one or more acid dianhydride components are reacted in a second solvent in which either the diamine components or the acid dianhydride components are present in an excessive amount, to form a second composition; and the first composition and the second composition are mixed and completely polymerized. Here, when the amount of the diamine components is excessive in the first composition, the amount of the acid dianhydride components is excessive in the second composition. Conversely, when the amount of the acid dianhydride components is excessive in the first composition, the amount of the diamine components is excessive in the second composition. That is, the total amount of the diamine components and the total amount of the acid dianhydride components are substantially equimolar to each other when the first composition and the second composition are mixed to be polymerized.

In one embodiment, a method of manufacturing the polyimide film according to the present disclosure includes:
providing a polyamic acid solution obtained from an acid dianhydride component and a diamine component;
forming a self-supporting film from the polyamic acid solution by casting and heating the polyamic acid solution on a support; and
obtaining a polyimide film by imidizing and stretching the self-supporting film.

The stretching is biaxial stretching, and tension is applied such that the stretching ratio in the MD direction is equal to the stretching ratio in the TD direction.

This stretching ratio can be confirmed on the basis of the balance between the MD characteristic and the TD characteristic measured through TMA measurement.

That is, the balance between the MD characteristic and the TD characteristic of the polyimide film, obtained by the stretching, is indicated by the value obtained by subtracting the coefficient of thermal expansion in the TD direction from the coefficient of thermal expansion in the MD direction, and the value will be in a range of 0 ppm/° C. or more and 2.5 ppm/° C. or less.

In the present disclosure, the polymerization method of the polyamic acid described above will be referred to as a random polymerization method, and the polyimide film prepared from the polyamic acid of the present disclosure by the method described above can be desirably used to maximize the effect of improving the flatness of a polyimide film.

However, since the polymerization methods described above produce polymers with relatively short repeating units in their chains, there may be limitations in exhibiting the excellent properties of the polymer chains derived from the acid dianhydride components. Therefore, the polyamic acid polymerization method that can be particularly preferably used in the present disclosure may be a block polymerization method.

On the other hand, the solvent used to synthesize polyamic acid is not particularly limited, and any solvent can be used if it can dissolve the polyamic acid. However, an amide-based solvent is preferably used.

Specifically, the organic solvent may be an organic polar solvent. Particularly, the organic solvent may be an aprotic polar solvent. One or more solvents selected from the group consisting of N,N-dimethylformamide (DMF), N,N-dimethylacetamide, N-methyl-pyrrolidone (NMP), gamma butyrolactone (GBL), and diglyme are preferably used, but the organic solvent used in the present disclosure is not limited thereto.

In one example, N,N-dimethylformamide and N,N-dimethylacetamide may be particularly preferably used as the organic solvent.

In addition, in the polyamic acid preparation process, a filler may be added for the purpose of improving various film properties, such as sliding properties, thermal conductivity, corona resistance, and loop hardness. The filler added is not particularly limited, but preferable examples of filler include silica, titanium oxide, alumina, silicon nitride, boron nitride, calcium hydrogen phosphate, calcium phosphate, mica, and the like.

The particle size of the filler is not particularly limited and may be determined depending on the film properties to be modified and on the type of filler added. Generally, the average particle size of the filler is in a range of from 0.05 to 100 μm, preferably a range of from 0.1 to 75 μm, more preferably a range of from 0.1 to 50 μm, and particularly preferably a range of from 0.1 to 25 μm.

When the particle size is smaller than the lower limit of the range, it is difficult to obtain the advantageous effect of the filler. On the other hand, when the size is larger than the upper limit of the range, the surface quality or mechanical properties of the formed film may be greatly deteriorated.

The amount of the filler added is not particularly limited and may be determined depending on the film properties to be improved and on the size of the filler added. Generally, the amount of the filler added is in a range of from 0.01 to 100 parts by weight, preferably a range of from 0.01 to 90 parts by weight, and more preferably a range of from 0.02 to 80 parts by weight, with respect to 100 parts by weight of a polyimide.

When the amount of the filler added is under the range, it is difficult to obtain the advantageous effect of the filler. On the other hand, when the amount of the filler added exceeds the range, the mechanical properties of the film may be deteriorated. The method of adding filler is not particularly limited, and any known method may be used.

In the present disclosure, the polyimide film may be manufactured by thermal imidization or chemical imidization.

The polyimide film also may be manufactured by a combined method of thermal imidization and chemical imidization.

The thermal imidization is a method of causing an imidization reaction using a source such as hot air or a dryer.

In the thermal imidization method, amic acid groups present in a gel film may be imidized by heat treatment at a variable temperature in a range of from 100° C. to 600° C. Particularly, amic acid groups in a gel film may be imidized by heat treatment in a range of from 200° C. to 500° C. and, more specifically, a range of from 300° C. to 500° C.

However, a portion of the amic acid (about 0.1 mol % to 10 mol %) may be imidized even in the process of forming the gel film. To this end, the polyamic acid composition may be dried in a variable temperature range of 50° C. to 200° C. This process can also be categorized into the thermal imidization method.

In the case of chemical imidization, a polyimide film may be prepared using a dehydrant and an imidization agent, by a method known in the art.

In one exemplary combined imidization method, a dehydrant and an imidization agent are added to a polyamic acid solution, the mixture is then heated to a temperature range of 80° C. to 200° C. and preferably a temperature range of 100° C. to 180° C. to be partially cured and dried, and the heat treated mixture is then heated in a temperature range of 200° C. to 400° C. for 5 to 400 seconds to produce a polyimide film.

The present disclosure provides a flexible metal foil clad laminate including the polyimide film described above and an electrically conductive metal foil clad.

The metal foil clad used herein is not particularly limited, but in the case of using the flexible metal foil clad laminate of the present disclosure for electronic or electrical components, the metal foil clad may be, for example, a copper or copper alloy foil clad, a stainless steel or stainless steel alloy foil clad, a nickel or nickel alloy foil clad (including 42 alloy), or an aluminum or aluminum alloy foil clad.

In typical flexible metal foil clad laminates, copper foil clads such as rolled copper foil clad and electrolytic copper foil clad are commonly used, and they can be preferably used in the present disclosure as well. Moreover, the metal foil clads may be coated with a rust prevention layer, a heat resistance layer, or an adhesive layer.

In the present disclosure, the thickness of the metal foil clad is not particularly limited, and the metal foil clads may have any thickness capable of exhibiting sufficient functions depending on their use.

The flexible metal foil clad laminate according to the present disclosure may be obtained by laminating, applying, sputtering, or depositing a metal foil clad on at least one side of the polyimide film.

In addition, the flexible metal foil clad laminate can be used as a 2-layer FCCL, can be particularly used for mobile phones, displays (LCD, PDP, OLED, etc.), etc., and can be used for FPCB and COF.

An electronic component including the flexible metal foil clad laminate may be, for example, a communication circuit for a portable terminal, a communication circuit for a computer, or a communication circuit for aerospace, but is not limited thereto.

MODE FOR INVENTION

Hereinafter, the actions and effects of the present disclosure will be described in more detail with reference to specific examples and preparation examples of the present disclosure. However, the examples and preparation examples are presented only on the illustrative purposes, and the scope of the present disclosure is not limited thereby.

Preparation Example: Preparation of Polyimide Film

Polyimide films according to the present disclosure can be manufactured by conventional methods known in the art. First, an organic solvent is reacted with an acid dianhydride component and a diamine component to obtain a polyamic acid solution.

In this case, the solvent may be an amide-based solvent, which is an aprotic polar solvent. For example, N,N'-dimethylformamide, N,N'-dimethylacetamide, N-methylpyrrolidone, or a combination thereof may be used as the solvent.

The acid dianhydride component and the diamine component may be added in the form of a powder, a mass, and a solution. Preferably, the acid dianhydride component and the diamine component may be added first in the form of a powder, and then the acid dianhydride component and the diamine component may be added in the form of a solution to control the polymerization viscosity.

The resulting polyamic acid solution may be mixed with an imidization catalyst and a dehydrant, and then the mixture is applied onto a support.

Examples of the catalyst used include, but are not limited to, tertiary amines (for example, isoquinoline, β-picoline, pyridine, etc.), and examples of the dehydrant include an acid anhydride. In addition, examples of the support may include, but are not limited to, a glass plate, an aluminum foil clad, a circulating stainless belt, or a stainless steel drum.

The film formed on the support is gelled on the support by dry air and heat treatment.

The gelled film is separated from the support and is then heat treated to be dried. Thus, the imidization is completed.

The heat-treated film may be further heat-treated under constant tension to remove internal residual stresses generated during the film forming process.

Specifically, 500 ml of DMF was injected into a reactor equipped with a stirrer and a nitrogen importing and exporting pipe while nitrogen was injected into the reactor. Next, the temperature of the reactor was set to 30° C. Next, biphenyltetracarboxylic dianhydride (50 mol %), pyromellitic dianhydride (50 mol %), paraphenylene diamine (13 mol %), and 4,4'-diaminodiphenyl ether (87 mol %) were added in a controlled composition ratio and in a predetermined order to be completely dissolved. Next, stirring was continued for 120 minutes while the reactor was heated to a temperature of 40° C. under a nitrogen atmosphere to prepare a polyamic acid having a primary reaction viscosity of 1,500 cP.

The polyamic acid thus prepared was stirred to give a final viscosity of 100,000 to 120,000 cP.

The catalyst and dehydrant in appropriate amounts were added to the prepared final polyamic acid, a polyimide film was prepared from the solution, using an applicator.

EXAMPLES AND COMPARATIVE EXAMPLES

Polyimide films were manufactured in the same manner as in the preparation example while adjusting the stretching degrees according to Examples and Comparative Examples as shown in Table 1.

That is, when the elongation of the film of Example 1 was considered as 100%, the elongation of the film of Example 2 was 120%, and the elongations of the films of Comparative Examples 1 to 3 were 150%, 140%, and 70%, respectively.

TABLE 1

| | Process conditions | CTE (ppm/° C.) | | Value calculated Formula (1) | After coating Film flatness (amount of |
|---|---|---|---|---|---|
| | Stretching | MD | TD | (μm) | wrinkles) |
| Example 1 | 100% | 5.7 | 4.8 | −32 | None |
| Example 2 | 120% | 6.0 | 5.3 | −20 | Almost none |
| Comparative Example 1 | 150% | 5.2 | 4.3 | 24 | Extremely many |
| Comparative Example 2 | 140% | 5.6 | 4.7 | 8 | Plenty |
| Comparative Example 3 | 70% | 14.7 | 14.4 | 75 | Extremely many |

For the prepared polyimde films, the coefficient of thermal expansion (CTE), glass transition temperature, modulus of elasticity, and flatness after metal foil clad lamination were measured.

In addition, after a metal layer was formed by sputtering on each of the prepared polyimide films, film flatness (wrinkle generation amount) was confirmed after coating.

(1) Measurement of Dimensional Change

The dimensional change was measured with a thermomechanical analyzer (TMA) while each prepared polyimide film first underwent a heating cycle from 25° C. 400° C. and subsequently a cooling cycle 400° C. to 25° C.

(2) Measurement of Coefficient of Thermal Expansion

For the coefficient of thermal expansion (CTE), a thermomechanical analyzer (Q400 model) manufactured by TA Instruments was used. The polyimide films were cut into samples that were 4 mm wide and 20 mm long. The samples were first heated to 300° C. from room temperature at a heating rate of 10° C./min under a nitrogen atmosphere with the application of a tension load of 0.05 N, and then cooled to 100° C. at a cooling rate of 10° C./min. The slope in a temperature zone of 50° C. to 200° C. was measured.

(3) Measurement of Film Flatness

Wrinkles along MD direction of each prepared polyimide film were observed through visual inspection.

(4) Measurement of Glass Transition Temperature

To obtain the glass transition temperature ($T_g$) of each film, the loss modulus and storage modulus of each film sample were obtained using DMA, and an inflection point on each tangent graph was taken as the glass transition temperature.

(5) Measurement of Elastic Modulus

The elastic modulus of each polyimide film was measured according to the ASTM D882 standard.

Graphs of dimensional change measurement results of Examples 1 and 2 are shown in FIGS. 1A and 1B, respectively. In addition, graphs of dimensional change measurement results of Comparative Examples 1 to 3 are shown in FIGS. 2A, 2B, and 2C, respectively.

Figure 2:
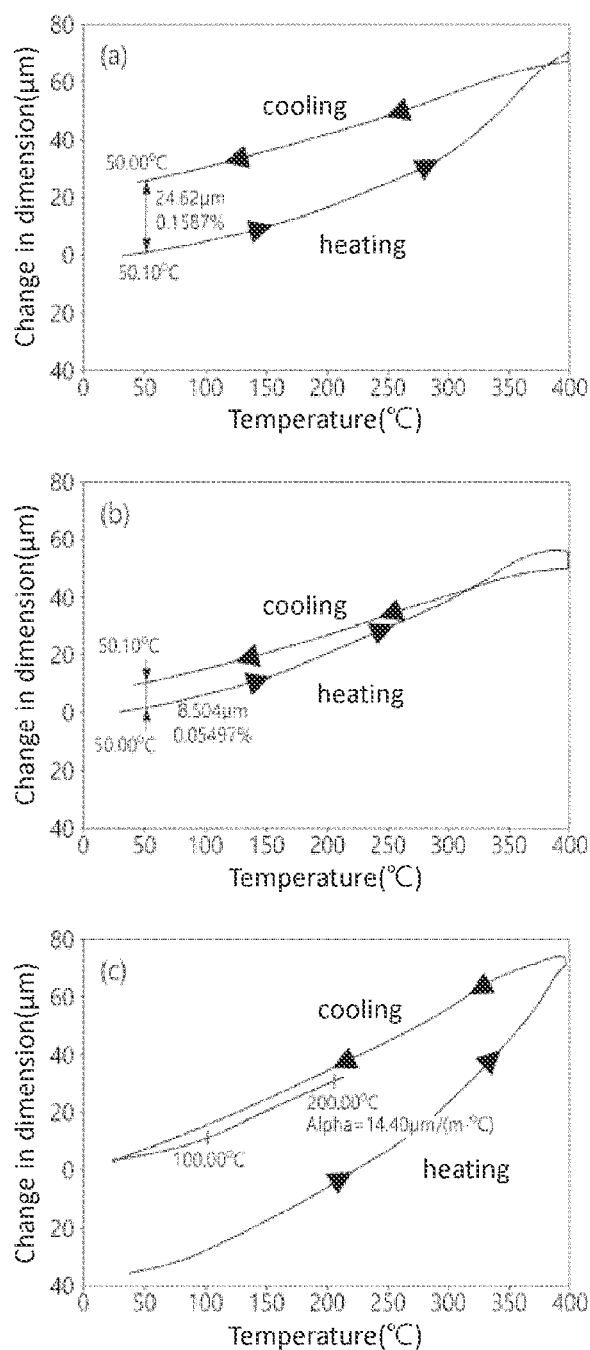
FIG. 2 is a graph showing measurements of dimensional changes measured by a thermomechanical analyzer (TMA) in which films according to Comparative Examples 1 to 3 undergo a heating cycle from 25° C. to 400° C. and subsequently a cooling cycle from 400° C. to 25° C.

As illustrated in FIG. 1, the values calculated according to Formula (1) for in Examples 1 and 2 was negative. In addition, as illustrated in FIG. 2, the values calculated according to Formula (1) for Comparative Examples 1 to 3 were positive.

The flatness measurement results after the coating of each film revealed that the films of Examples 1 and 2, which produced negative values when calculated according to Formula (1), had superior flatness to the films of Comparative Examples 1 to 3, which produced positive values when calculated according to Formula (1). That is, the films of Examples 1 to 2 had no or almost no wrinkles.

The examples and preparation example regarding the polyimide film and manufacturing method according to the present disclosure are only preferred examples that enable those skilled in the art to easily practice the inventions, and it should be understood that the scope of the present disclosure is not limited by the examples and preparation example. Therefore, the true technical protection scope of the present disclosure will be defined by the technical spirit of the appended claims. In addition, it will be clear to those skilled in the art that various substitutions, modifications, and changes are possible without departing from the technical spirit of the present disclosure, and it is obvious that parts easily changeable by those skilled in the art will also fall within the scope of the present disclosure.

INDUSTRIAL APPLICABILITY

The present disclosure provides a polyimide film having a predetermined dimensional change range, thereby having excellent flatness even after metal foil lamination is performed on the polyimide film.

The polyimide film has applications in various fields where a polyimide film with excellent flatness is required. For example, the polyimide film may be used in flexible metal foil clad laminates prepared by a metallization method or in electronic components including the flexible metal foil clad laminate.

The invention claimed is:

1. A polyimide film exhibiting dimensional changes satisfying Formula (1) below during a dimensional change measurement process, the dimensional changes being measured using a thermomechanical analyzer (TMA) in which the polyimide film first undergoes a heating cycle up to 400° C. from 25° C. and subsequently a cooling cycle down to 25° C. from 400° C., wherein the polyimide film has a degree of stretching in the range of 100% to 120%, and wherein the coefficient of thermal expansion in an MD direction is 2 to 6.5 ppm/° C.;

$$\text{TD dimension value measured (cooling, } 50°\text{ C.)} - \text{TD dimension value measured (heating, } 50°\text{ C.)} < 0 \text{ μm} \quad \text{Formula (1)}$$

in Formula (1) above, the TD-direction dimension measurement value (cooling, 50° C.) refers to a value of a dimension measured along a TD direction, the measurement value being measured at 50° C. during the cooling cycle, and the TD-direction dimension measurement value (heating, 50° C.) refers to a value of a dimension along the TD direction, the measurement value being measured at 50° C. during the heating cycle, wherein the value of equation (1) is −32, when the degree of stretching is 100% and the value of equation (1) is −20, when the degree of stretching is 120%.

2. The polyimide film of claim 1, wherein the coefficient of thermal expansion in the TD direction is 1 to 6 ppm/° C.

3. The polyimide film of claim 2, wherein when the coefficient of thermal expansion in the TD direction is subtracted from the coefficient of thermal expansion in the MD direction, a value in a range of 0 ppm/° C. or more and 2.5 ppm/° C. or less is obtained.

4. The polyimide film of claim 1, wherein the polyimide film has an elastic modulus in a range of 5 GPa or more and 11 GPa or less and a glass transition temperature in a range of 360° C. or more and 400° C. or less.

5. The polyimide film of claim 1, wherein the polyimide film is obtained by imidizing one or more acid dianhydride components and one or more diamine components,
the one or more acid dianhydride components being selected from the group consisting of pyromellitic dianhydride (PMDA), oxydiphthalic dianhydride (ODPA), 3,3',4,4'-biphenyltetracarboxylic dianhydride (s-BPDA), 2,3,3',4'-biphenyltetracarboxylic dianhydride (a-BPDA), diphenylsulfone-3,4,3',4'-tetracarboxylic dianhydride (DSDA), bis(3,4-dicarboxyphenyl) sulfide dianhydride, 2,2-bis(3,4-dicarboxyphenyl)-1,1,1,3,3,3-hexafluoropropane dianhydride, 2,3,3',4'-benzophenonetetracarboxylic dianhydride, 3,3',4,4'-benzophenonetetracarboxylic dianhydride (BTDA), bis(3,4-dicarboxyphenyl) methane dianhydride, 2,2-bis(3,4-dicarboxyphenyl) propane dianhydride, p-phenylenebis(trimellitic monoester acid anhydride), p-biphenylenebis(trimellitic monoester acid anhydride), m-terphenyl-3,4,3',4'-tetracarboxylic dianhydride, p-terphenyl-3,4,3',4'-tetracarboxylic dianhydride, 1,3-bis(3,4-dicarboxyphenoxy)benzene dianhydride, 1,4-bis(3,4-dicarboxyphenoxy)benzene dianhydride, 1,4-bis(3,4-dicarboxyphenoxy) biphenyl dianhydride, 2,2-bis[(3,4-dicarboxyphenoxy)phenyl] propane dianhydride (BPADA), 2,3,6,7-naphthalenetetracarboxylic dianhydride, 1,4,5,8-naphthalenetetracarboxylic dianhydride, and 4,4'-(2,2-hexafluoroisopropylidene)diphthalic dianhydride,
the one or more diamine components being selected from the group consisting of paraphenylenediamine (PPD), metaphenylenediamine, 3,3'-dimethylbenzidine, 2,2'-dimethylbenzidine, 2,4-diaminotoluene, 2,6-diaminotoluene, 3,5-diaminobenzoic acid (DABA), 4,4'-diaminodiphenyl ether (ODA), 3,4'-diaminodiphenyl ether, 4,4'-diaminodiphenylmethane(methylenediamine), 3,3'-dimethyl-4,4'-diaminobiphenyl, 2,2'-dimethyl-4,4'-diaminobiphenyl, 2,2'-bis(trifluoromethyl)-4,4'-diaminobiphenyl, 3,3'-dimethyl-4,4'-diaminodiphenylmethane, 3,3'-dicarboxy-4,4'-diaminodiphenylmethane, 3,3',5,5'-tetramethyl-4,4'-diaminodiphenylmethane, bis(4-aminophenyl) sulfide, 4,4'-diaminobenzanilide, 3,3'-dimethoxybenzidine, 2,2'-dimethoxybenzidine, 3,3'-diaminodiphenyl ether, 3,4'-diaminodiphenyl ether, 4,4'-diaminodiphenyl ether, 3,3'-diaminodiphenyl sulfide, 3,4'-diaminodiphenylsulfide, 4,4'-diaminodiphenylsulfide, 3,3'-diaminodiphenylsulfone, 3,4'-diaminodiphenylsulfone, 4,4'-diaminodiphenylsulfone, 3,3'-diaminobenzophenone, 4,4'-diaminobenzophenone, 3,3'-diamino-4,4'-dichlorobenzophenone, 3,3'-diamino-4,4'-dimethoxybenzophenone, 3,3'-diaminodiphenylmethane, 3,4'-diaminodiphenylmethane, 4,4'-diaminodiphenylmethane, 2,2-bis(3-amino Phenyl) propane, 2,2-bis(4-aminophenyl) propane, 2,2-bis(3-aminophenyl)-1,1,1,3,3,3-hexafluoropropane, 2,2-bis(4-aminophenyl)-1,1,1,3,3,3-hexafluoropropane, 3,3'-diaminodiphenylsulfoxide, 3,4'-diaminodiphenylsulfoxide, 4,4'-diaminodiphenylsulfoxide, 1,3-bis(3-aminophenyl)benzene, 1,3-bis(4-aminophenyl)benzene, 1,4-bis(3-aminophenyl)benzene, 1,4-bis(4-aminophenyl)benzene, 1,3-bis(4-aminophenoxy)benzene (TPE-R), 1,4-bis(3-aminophenoxy)benzene (TPE-Q), 1,3-bis(3-aminophenoxy)-4-trifluoromethylbenzene, 3,3'-diamino-4-(4-phenyl) phenoxybenzophenone, 3,3'-diamino-4,4'-di(4-phenylphenoxy)benzophenone, 1,3-bis(3-aminophenylsulfide)benzene, 1,3-bis(4-aminophenylsulfide)benzene, 1,4-bis(4-aminophenylsulfide) benzene, 1,3-bis(3-aminophenylsulfone)benzene, 1,3-bis(4-aminophenylsulfone)benzene, 1,4-bis(4-aminophenylsulfone)benzene, 1,3-bis[2-(4-aminophenyl) isopropyl] benzene, 1,4-bis[2-(3-aminophenyl) isopropyl] benzene, 1,4-bis[2-(4-aminophenyl) isopropyl] benzene, 3,3'-bis(3-aminophenoxy) biphenyl, 3,3'-bis(4-aminophenoxy) biphenyl, 4,4'-bis(3-aminophenoxy) biphenyl, 4,4'-bis(4-aminophenoxy)) biphenyl, bis[3-(3-aminophenoxy) phenyl] ether, bis[3-(4-aminophenoxy)phenyl] ether, bis[4-(3-aminophenoxy)phenyl] ether, bis[4-(4-aminophenoxy)phenyl] ether, bis[3-(3-aminophenoxy)phenyl] ketone, bis[3-(4-aminophenoxy)phenyl] ketone, bis[4-(3-aminophenoxy)phenyl] ketone, bis[4-(4-aminophenoxy)phenyl] ketone, bis[3-(3-aminophenoxy) phenyl] sulfide, bis[3-(4-aminophenoxy)phenyl] sulfide, bis[4-(3-aminophenoxy)phenyl] sulfide, bis[4-(4-aminophenoxy)phenyl] sulfide, bis[3-(3-aminophenoxy)phenyl] sulfone, bis[3-(4-aminophenoxy)phenyl] sulfone, bis[4-(3-aminophenoxy)phenyl] sulfone, bis[4-(4-aminophenoxy)phenyl] sulfone, bis[3-(3-aminophenoxy)phenyl] methane, bis[3-(4-aminophenoxy)phenyl] methane, bis[4-(3-aminophenoxy)phenyl] methane, bis[4-(4-aminophenoxy)phenyl] methane, 2,2-bis[3-(3-aminophenoxy)phenyl] propane, 2,2-bis[3-(4-aminophenoxy)phenyl] propane, 2,2-bis[4-(3-aminophenoxy)phenyl] propane, 2,2-bis[4-(4-aminophenoxy)phenyl] propane (BAPP), 2,2-bis[3-(3-aminophenoxy)phenyl]-1,1,1,3,3,3-hexafluoropropane, 2,2-bis[3-(4-aminophenoxy)phenyl]-1,1,1,3,3,3-hexafluoropropane, 2,2-bis[4-(3-aminophenoxy)phenyl]-1,1,1,3,3,3-hexafluoropropane, and 2,2-bis[4-(4-aminophenoxy)phenyl]-1,1,1,3,3,3-hexafluoropropane.

6. The polyimide film of claim 1, wherein the polyimide film is obtained by an imidization reaction of a polyamic acid comprising: an acid dianhydride component including at least one selected from 3.3',4,4'-biphenyltetracarboxylic dianhydride (s-BPDA) and pyromellitic dianhydride (PMDA); and a diamine component including at least one selected from paraphenylene diamine (PPD) and 4,4'-diaminodiphenyl ether (ODA).

7. The polymide film, of claim 6, wherein based on a total content of 100 mol % of the acid dianhydride component, the content of the 3,3',4,4'-biphenyltetracarboxylic dianhydride is 40 mol % or more and 60 mol % or less, and the content of the pyromellitic dianhydride is 40 mol % or more and 60 mol % or less, and
based on a total content of 100 mol % of the diamine component, the content of the paraphenylene diamine is 80 mol % or more and 90 mol % or less, and the content of the 4,4'-diaminodiphenyl ether is 10 mol % or more and 20 mol % or less.

8. A method of manufacturing the polyimide film of claim 1, the method including:
preparing a polyamic acid solution from an acid dianhydride component and a diamine component;
forming a self-supporting film by casting and heating the polyamic acid solution on a support; and
imidizing and stretching the self-supporting film to produce the polyimide film.

9. A flexible metal foil clad laminate comprising the polyimide film of claim 1 and an electrically conductive metal foil clad.

10. The flexible metal foil laminate of claim 9, wherein the metal foil clad is formed by coating, sputtering, or deposition.

\* \* \* \* \*